(12) United States Patent
Molloy et al.

(10) Patent No.: US 6,425,118 B1
(45) Date of Patent: Jul. 23, 2002

(54) SYSTEM FOR AUTOMATICALLY GENERATING TESTS TO ENSURE BINARY COMPATIBILITY BETWEEN SOFTWARE COMPONENTS PRODUCED BY A SOURCE-TO-SOURCE COMPUTER LANGUAGE TRANSLATOR

(75) Inventors: Mark E. Molloy, Knoxville, IA (US); Kristy A. Andrews, Palo Alto, CA (US); James L. Herren, Milpitas, CA (US); David R. Cutler; Paul Del Vigna, both of San Jose, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/118,403

(22) Filed: Jul. 17, 1998

Related U.S. Application Data (60) Provisional application No. 60/052,955, filed on Jul. 18, 1997.

(51) Int. Cl.[7] .................................................. G06F 9/45
(52) U.S. Cl. .............................................. 717/4; 717/5
(58) Field of Search ................................ 395/704–710, 395/500.48; 714/37, 38; 717/4–10; 703/22, 23, 26, 27

(56) References Cited

U.S. PATENT DOCUMENTS

| | | | |
|---|---|---|---|
| 4,667,290 A | 5/1987 | Goss et al. | 717/7 |
| 4,729,096 A * | 3/1988 | Larson | 717/4 |
| 4,956,809 A | 9/1990 | George et al. | 707/101 |

(List continued on next page.)

FOREIGN PATENT DOCUMENTS

| | | |
|---|---|---|
| EP | 0 361 737 A2 | 8/1989 |
| EP | 0 361 737 A3 | 8/1989 |
| EP | 0 583 117 A2 | 2/1994 |

OTHER PUBLICATIONS

Robbert et al., Automated Test plan generator for database application systems, ACM, 1991, pp 100–106.*

Harrold et al., "Interprocedural data flow testing", ACM, 1989, pp 158–167.*

(List continued on next page.)

*Primary Examiner*—Kakali Chaki
(74) *Attorney, Agent, or Firm*—Oppenheimer Wolff & Donnelly LLP; Leah Sherry (57) ABSTRACT

A system and method that implement a strategy for automatically generating self-checking tests of source-to-source translation. The tests make certain that software components produced by a source-to-source computer language translator continue to be binary-compatible with all other software components with which they previously interacted correctly, including components that remain in the original programming language. To that end, the correctness of procedure interfaces in a target computer program is also verified. With this strategy, correct translation of text preprocessor mechanisms such as macros, conditionally compiled regions of code, and source file inclusion can be achieved. The target program is the result of translating a source program written in a different language from the target program. The system creates a set of procedure calls to each procedure in the source program. The system also creates a set of callable procedures with the same interface specification as in the source program. However, the callable procedures created by the system to serve to perform tests on variables and other data that is passed to each procedures' interface specification. The system-generated procedure calls are designed to assign different test values to ensure that a valid interface exists. For example, high, low, zero, and random values, or other values, are chosen for a variable to test. The procedure calls, and callable procedures, are generated in the source language and are also translated into the target language by a translator. The procedure calls and callable procedures in both language formats are then cross-linked and executed to determine whether the translator is translating correctly with respect to the procedure interface specifications.

20 Claims, 4 Drawing Sheets

U.S. PATENT DOCUMENTS

| | | | | |
|---|---|---|---|---|
| 5,148,379 | A | | 9/1992 | Konno et al. .......... 395/500.21 |
| 5,367,683 | A | | 11/1994 | Brett .......................... 395/700 |
| 5,418,943 | A | | 5/1995 | Borgida et al. ................. 707/4 |
| 5,477,451 | A | | 12/1995 | Brown et al. .......... 364/419.08 |
| 5,640,550 | A | * | 6/1997 | Coker ............................ 707/4 |
| 5,754,860 | A | * | 5/1998 | McKeeman et al. ........... 717/4 |
| 5,768,564 | A | | 6/1998 | Andrews et al. ............ 395/705 |
| 5,842,204 | A | | 11/1998 | Andrews et al. ................ 707/3 |
| 5,852,740 | A | | 12/1998 | Estes ..................... 395/800.15 |
| 5,903,859 | A | | 5/1999 | Stone et al. .................... 704/8 |
| 6,041,330 | A | * | 3/2000 | Carman et al. ............. 707/101 |

OTHER PUBLICATIONS

Hammerslag, David, et al., "Tree–Oriented Interactive Processing with an Application to Theorem–Proving,"Proceedings of a Second Conference on Software Development Tool, Techniques, and Alternatives, (CAT. No. 85CH2231–9) pp. 199–206.

Merlo, E., et al., "Structural and Behavorial Code Representative for Program Understanding," Proceedings of the Fifth International Workshop on Computer–Aided Software Engineering, (CAT. No. 92CH3166–6) pp. 106–108.

Hatcher, Philip J., et al., "A Production–Quality C* Compiler for Hypercube Multicomputers," Proceedings of the Third ACM SIGPLAN Symposium on Principles & Practice of Parallel Programming PPOPP, SIGPLAN Notices, (1991) vol. 26 (7) pp. 73–82.

Heun, Volker, et al., "Optimal Dynamic Edge–Disjoint Embeddings of Complete Binary Trees into Hypercubes," Proceedings of the $4^{th}$ Workshop on Parallel Systems & Algorithms, PASA '96 (1996) (ISBN 981–02–03044–3) pp. 195–209.

Andrews, K., et al., "Macro and File Structure Preservation in Source–to–Source Translation", *Software–Practice and Experience*, Mar. 1996 vol. 26 (3) pp. 281–292.

Aho,A., et al., Compilers: Principles, Techniques and Tools, Addison–Wesley Publishing Company, (1986) (ISBN 0–201–10088–6); Preface, table of Contents, Chapters 2, 5, and 8.

Wang, Jason T.L., et al., "A Tool for Tree Pattern Matching", Third International Conference on Tools for Artificial Intelligence TAI '91 (CAT. No. 91CH3054–4) pp. 436–444.

Micallef, Josephine, et al., "Support Algorithmms for Incremental Attribute Evaluation of Asynchronous Subtree Replacements", *IEEE Transactions on Software Engineering*, (1993) vol. 19, No. 3, pp. 231–252.

Cardenas, Alfonso F., et al., "Doubly–chained Tree Date Base Organisation—Analysis and Design Stategies", *Computer Journal*, (ISSN 0010–4620, UK) vol. 20, No. 1, 7 pp. 15–26.

Platoff, M., et al., "An Integrated Program Representation and Toolkit for the Maintenance and Toolkit for the Maintenance of C Programs" Proceedings of the Conference on Software Maintenance, Electrical and Electronics Engineers, (1991) pp. 129–137.

Ladd, D.A., et al., "A Language for Implementing Language Processors", *IEEE* (1994) pp. 3–5.

* cited by examiner

SYSTEM FOR AUTOMATICALLY GENERATING TESTS TO ENSURE BINARY COMPATIBILITY BETWEEN SOFTWARE COMPONENTS PRODUCED BY A SOURCE-TO-SOURCE COMPUTER LANGUAGE TRANSLATOR

CROSS-REFERENCE TO RELATED APPLICATIONS

This Application claims the benefit of U.S. Provisional Application Ser. No. 60/052,955 filed Jul. 18, 1997. This application is related to, and incorporates by reference, the following U.S. Patents and Patent Applications: patent application Ser. No. 08/332,966 filed Nov. 1 1994; patent application Ser. No. 08/319,682 filed Oct. 7, 1994, now issued as U.S. Pat. No. 5,768,564; and co-pending patent application Ser. No. 09/118,477, entitled "SYSTEM FOR ENSURING THE ACCURACY OF FILE STRUCTURES IN A SOURCE-TO-SOURCE COMPUTER PROGRAM TRANSLATOR" filed on Jul. 7 1998, the same day as the present application, said co-pending Patent Application deriving from Provisional Patent Application Serial No. 60/053,045.

BACKGROUND OF THE INVENTION

This invention relates to compiler construction technology. More specifically, the present invention relates to the accurate translation of computer programs from one computer language to another.

Computer program, or "code," translators are useful for translating a computer program written in a first language (the "original," or "source" language) into a second language (the "target" language). For example, some older languages may become unpopular or outdated making their programs difficult to support because of lack of skilled programmers, lack of compatible computers to execute the code, etc. Or, a company or user of original source code may wish to translate the code to be in the same language as other programs, or to migrate the code to a computer system that doesn't support the original language.

However, the accurate translation between computer languages is extremely difficult because of the magnitude and complexity of today's computer programs. One area of difficulty in source-to-source translations is ensuring the accuracy of the translation. Since the translator itself is a large and complex computer program, like all large and complex computer programs, it is not guaranteed to operate without errors. Additionally, the translator itself may introduce an error into the target program code so that the target program behaves differently than the source program code.

Thus, a translator system that can detect discrepancies between original program code and translated program code is desirable.

SUMMARY OF THE INVENTION

The present invention provides a strategy for automatic generation of tests for source-to-source translators. This strategy makes certain that converted software components, produced in a different programming language by a source-to-source translator, are binary-compatible with all other software components of the original program that remain unchanged. With this strategy, converted software components continue as before to interact correctly with software components that remain in the original programming language. (An original computer program, with all original software components, is also referred to as the "source program". Original software components that remain unchanged are also referred to as the "legacy code" and "legacy data" or collectively the "legacy code". Converted software components are also referred to as the "target code". A computer program that includes both target and legacy code is also referred to as the "target program".)

Since target code is required to be operable with legacy code, the present invention makes certain that procedure interfaces in the target program are correct. More specifically, structure layouts are required to be binary compatible, and global variable must remain shareable. In addition, procedure calls involving both target code and legacy code are required to work seamlessly in that conversion of software components, such as processes, is transparent to the unconverted software components (i.e., legacy code).

To that end, the present invention provides a method and, for implementing the method, a system that creates a set of procedure calls to each procedure in the source program. The system also creates a set of callable procedures with the same interface specification as in the source program. The callable procedures created by the system serve to perform tests on variables and other data that is passed to each procedure via each procedures' interface specification.

The system-generated procedure calls are designed to assign different test values to each variable while the system-generated procedures are designed to test for the value to ensure that a valid interface exists. For example, high, low, zero, and random values, or other values, are chosen for a variable to test. The procedure calls, and callable procedures, are generated in the source language and are also translated into the target language by a translator. The procedure calls and callable procedures in both language formats are then cross-linked and executed to determine whether the translator is translating correctly with respect to the procedure interface specifications.

In one embodiment the invention provides a method for assuring the valid operation of a translator that translates an original computer program into a target computer program in a target language. The target language is different from the language of the original computer program. The original program includes procedures that have interface specifications. The method is executed in the system by a processor coupled to a storage device. The method includes obtaining the interface specifications from one or more procedure calls in the original computer program. The method also includes deriving and storing test procedures that use the obtained interface specifications to determine whether a variable value passed to the test procedures during execution of the test procedures is valid; using the translator to translate the test procedures onto the target language; linking the translated test procedures to one or more portions of the original computer program to produce a test module; executing the test module to execute the test procedures; and determine whether passed variable values are valid. The method further includes indicating an error condition if a passed variable value is invalid.

Another embodiment provides a method for verifying the operation of a translator for translating computer programs from a first language into a second language, the method including steps of deriving test procedures having procedure interfaces analogous to the procedure interfaces in the first language; and analyzing procedure interfaces in both the first and second languages by linking the test procedures to portions of the computer programs.

Thus, in accordance with the purpose of the present invention as embodied and broadly described herein, the present invention relates to a method for automatic generation of self-checking tests of a source-to source translation. The method includes generating test components from a source program code, the test components being in an original language; performing a source-to-source translation of the test components to produce target test components in a target language different from the original language; compiling the test components and target test components, the compilation producing test objects and target test objects, respectively; and linking, respectively, the test objects with target test objects, the linked test and target test objects being executable tests. The generating step of the method further includes scanning the source program code, the scanning producing a virtual source that represents the source program code; and parsing the virtual source, the parsing produces the representation in the form of a syntax tree of the virtual source. When the original language is Ptal, the source-to-source translation produces the target test components in C++. The test components are Verify and Do, and the source-to-source translation of the test components is performed by a Rosetta Translator. It is noted that the virtual source is in the form of a fragment tree.

In further accordance with the purpose of the invention as embodied and broadly described herein, the present invention also relates to a system for automatically generating self-checking tests of a source-to source translation. The system includes a scanner that receives a source program code and produces therefrom a virtual source representing the source program code; a parser that produces a syntax tree representation of the virtual source; a test generator that produces test components, the test components being in an original language; a translator, preferably a Rosetta Translator, that performs a source-to-source translation of the test components in order to produce target test components in a target language that is different from the original language; a compiler that produces test objects and target test objects, respectively, from the test components and target test components; and a linker that produces executable tests by linking, respectively, the test objects with the target test objects.

Various modifications to the preferred embodiment will be apparent to those skilled in the art from consideration of the disclosure and practice of the invention disclosed herein and the generic principles herein may be applied to other embodiments. Thus, the present invention is not intended to be limited to the embodiments shown, but is to be accorded the widest scope consistent with principles and features described herein.

BRIEF DESCRIPTION OF THE DRAWINGS

The accompanying drawings, which are incorporated and constitute a part of this specification, illustrate several embodiments of the invention and together with the description serve to explain the principles of the invention. Whenever convenient, the same reference numbers will be used throughout the drawings to refer to the same or like elements. Briefly, the drawings are described as follows.

DETAILED DESCRIPTION OF THE INVENTION

The present invention provides a system and method that implement a strategy for automatically generating self-checking tests of source-to-source translation. The tests make certain that software components produced by a source-to-source computer language translator continue to be binary-compatible with all other software components with which they previously interacted correctly, including components that remain in the original programming language. To that end, the correctness of procedure interfaces in a target computer program is also verified. With this strategy, correct translation of text preprocessor mechanisms such as macros, conditionally compiled regions of code, and source file inclusion can be achieved.

Automated source-to-source translation is an attractive vehicle for migrating legacy software out of a proprietary programming language. This technique has been used to translate software with millions of code lines, a large percentage of which being shared interfaces. However, in contrast to the present invention, conventional schemes directed at automated test generation do not automatically generate self-checking tests to guarantee inter-language compatibility of interfaces. For instance, program verification strives to automatically verify the correct execution of a body of code; but this effort concentrates solely on verifying the correct translation of high-level language interfaces. Automated compiler test generators are available for stressing compilers by generating tests that exhaustively check combinations of constructs, and a variety of scripting tools for GUIs are available. Again, such tools do not automatically generate self-checking tests to guarantee inter-language compatibility of interfaces as provided by the present invention.

For automated source-to-source translation to be effective, the present invention provides self-checking tests and requires target code generated by a source-to-source translator to be interoperable with legacy code, structure layouts to be binary-compatible and global variables to remain sharable. The present invention also requires procedure calls to work seamlessly so that the conversion of procedure calls is transparent to unchanged procedure calls, and the interfaces between them are seamless.

Thus, in accordance with the present invention, automatically generated tests of source-to-source translation are required to use the actual source code and translations (target code) via source inclusion directives. This guarantees that the actual set of source language definitions and their translations are tested. In addition, the generated tests are required to exercise exhaustively all of the interface components of production software that is undergoing translation. Elements to be tested include, for example: 1) every field of every structure type; 2) every global variable; 3) every parameter, and the result type, of every procedure, and 4) every literal (named constant value).

Figure 1:
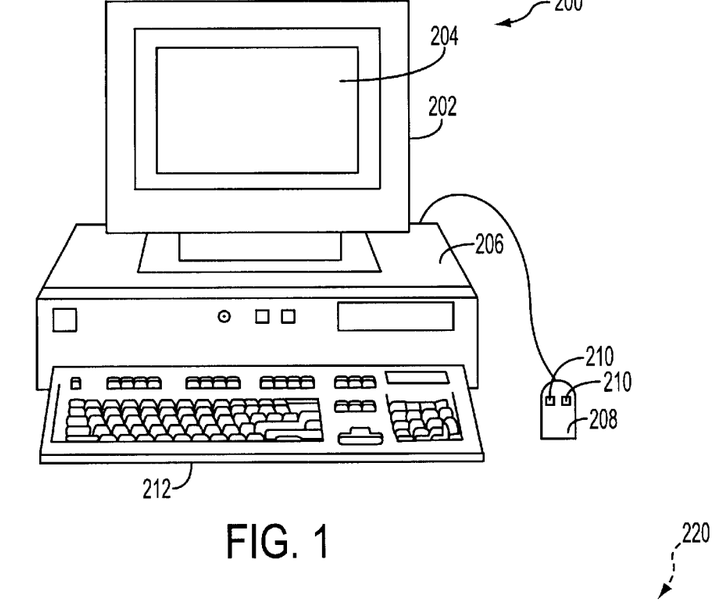
FIG. 1 illustrates a computer system embodying the present invention.
Figure 2:
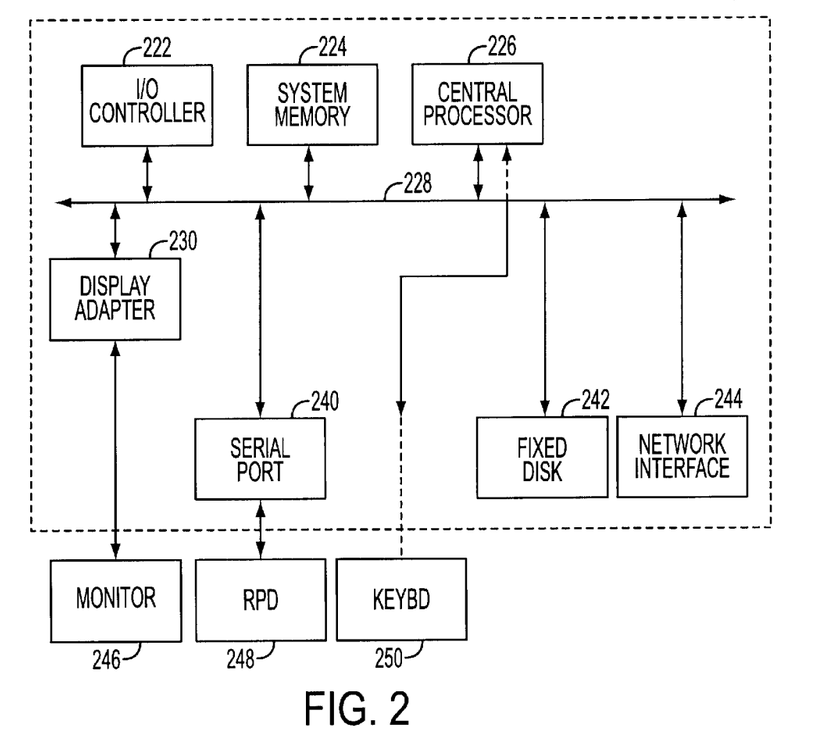
FIG. 2 illustrates subsystems of the computer system of FIG. 1.

The strategy in accordance with the present invention can be implement in a variety of computer systems. One example of a computer system 200 embodying the present invention is provided in FIG. 1. Computer system 200 includes display 202 having display screen 204. Cabinet 206 houses standard computer components (not shown) such as a disk drive, CDROM drive, display adapter, network card, random access memory (RAM), central processing unit (CPU), and other components, subsystems and devices. User input devices include devices such as mouse 208 with buttons 210 and a keyboard 212. Although not shown, other user input devices such as a trackball, touch-screen, digitizing tablet, etc. can be used. The illustrated computer system is a desktop computer, although any computer system is suitable for embodying the invention, including laptop, palmtop, pentop, server, workstation, mainframe etc. FIG. 2 illustrates subsystems typically found in a computer such as computer system 200 of FIG. 1. In this example, the subsystems are contained in a cabinet 206 within box 220. The subsystems in box 220 are interconnected and exchange data via internal bus 228 (typically, the main data bus). The box 220 includes subsystem such as an input/output (I/O) controller 222, a system memory (e.g., RAM) 224, a central processing unit (CPU) 226, a display adapter 230, a serial port 240, a fixed disk 242, and a network interface adapter 244. Monitor 246 is operatively connected to other subsystems through a display adapter 230. A relative pointing device (RPD, e.g., a mouse) is connected through serial port 240. Devices such as a keyboard 250 can communicate with the CPU 226 by direct means including an interrupt controller and associated registers without using the internal bus (main data bus). As is the case with the external physical configuration shown in FIG. 1, various subsystem configurations are possible. For example, a standalone computer need not be coupled to a network so a network interface 244 would not be required. Moreover, subsystems such as CDROM drive, graphics accelerator (not shown) can be included.

Preferably, the present invention is embodied in a software system that is installed within the computer system. The present invention may be embodied in the software system as a separate module for source-to-source translation or it can be embodied as part of a compiler. Preferably, the present invention is implemented in an automated interface test generator (AITG) that executes translator software, called the "Rosetta Translator," which is presently made by Compaq Computer Corporation. In general, the AITG in accordance with the present invention is based on the Rosettal Translator but with additional steps. To function, the AITG looks to the front end of the Rosetta Translator. The Rosetta Translator implements automated translation that preserves macros and source file structures. The Rosetta Translator translates Ptal to C++. The source language, Ptal, is a proprietary block-structured system programming language, originally derived from Algol-60. The functional design strategy of this implementation is to reduce and eventually eliminate dependencies on less popular programming languages while supporting huge bodies of legacy software.

Automated Interface Test Generator (AITG) Overview As a preview to the AITG description, the following terms are first explained.

Virtual Source: a program's virtual source is a stream of tokens that a compiler parses to create a syntax tree representing that program. The virtual source is often the output of a preprocessor. Virtual source typically does not exist in textual form in any single source file; the token stream is created by a series of source file inclusions, macro expansions, and macro formal parameter substitutions.

Virtual Source Production Mechanisms: virtual source production mechanisms are used by a scanner or preprocessor to create virtual source. Virtual source production mechanisms that are available in Ptal and C++ include source inclusion of files, macro expansion, and macro formal parameter substitution. A virtual source production mechanism can appear anywhere in a source file and its invocation can yield any portion of a syntactic construct; it need not honor syntactic construct boundaries. For example, a macro invocation can appear anywhere in a source file and the resulting macro expansion can yield a portion of a syntactic construct.

Fragment: a fragment contains the stream of tokens that result from invoking a virtual source production mechanism. It is noted that some of these tokens may themselves represent virtual source production mechanisms.

Fragment Tree: a fragment tree represents every source inclusion, macro expansion, and macro actual parameter substitution that was employed to create the virtual source. The leaves of the fragment tree are the tokens of the virtual source.

Invocation Syntax:. When a text preprocessor recognizes a reference to a macro, for example "mac(5)," it substitutes text from the body of the macro at that point. The tokens representing "mac(5)" compose the invocation syntax for that macro. Macro formal parameters and source file inclusion behave like parameterless macro invocations. The invocation syntax for a macro formal parameter is the name of the formal parameter referenced in the macro body. The invocation syntax for source file inclusion is a preprocessor directive.

Figure 3:
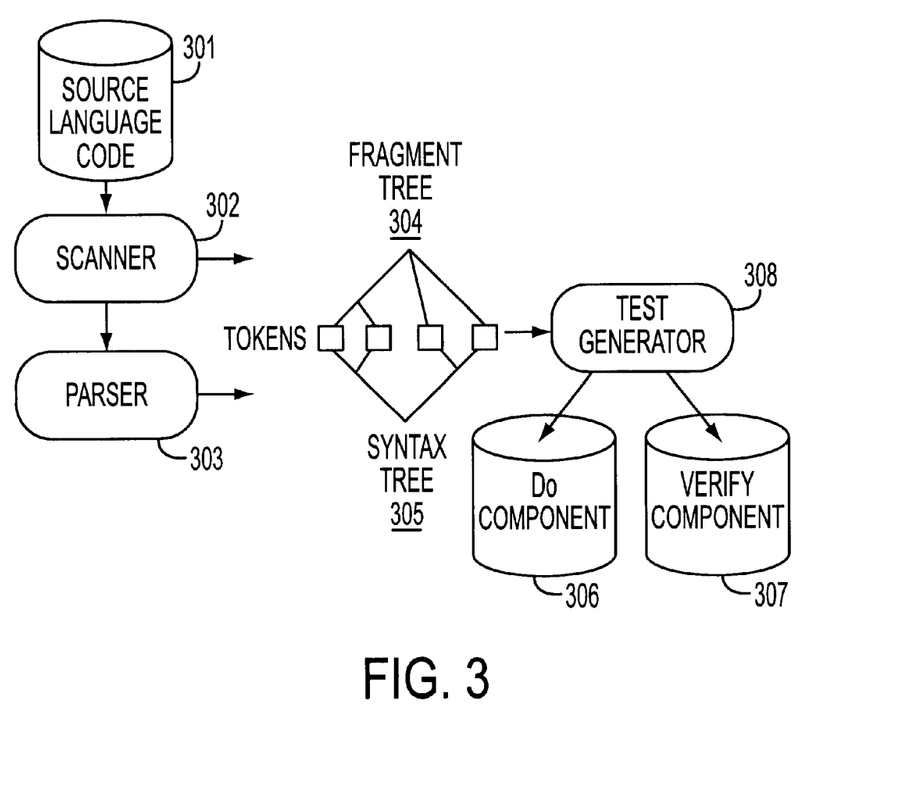
FIG. 3 provides a diagram overview of an Automated Interface Test Generator in accordance with the present invention.

As indicated above, the present invention is preferably implemented in the automated interface test generator (AITG) that executes the Rosetta Translator. FIG. 3 provides a diagram overview of the AITG in accordance with the present invention and will be explained in more detail below. A more detailed overview of the AITG is hereafter provided.

As shown in FIG. 3, the AITG receives as input the source language code 301. In this instance, the input to the AITG is a Ptal program. The AITG derives the data declarations and procedure profiles that it tests from this input program. The AITG tests only interface elements that it scans from the input program, via scanner 302. It does not, for example, use an external data dictionary or other repository. The scanning 302 uses virtual production mechanisms to produce a virtual source represented by a fragment tree 304. The virtual source is parsed, via parser 303, to produce a source language syntax tree 305 (or simply "syntax tree"). The test generator 308 of the AITG generates two components, the Do component 306 and the Verify component 307 (details of which are explained later). Preferably, the AITG generates Ptal code for both the Do and Verify components. Each component is translated by the Rosetta Translator, and bound with the opposite non-translated component. This creates four tests for inter-language compatibility.

Figure 4:
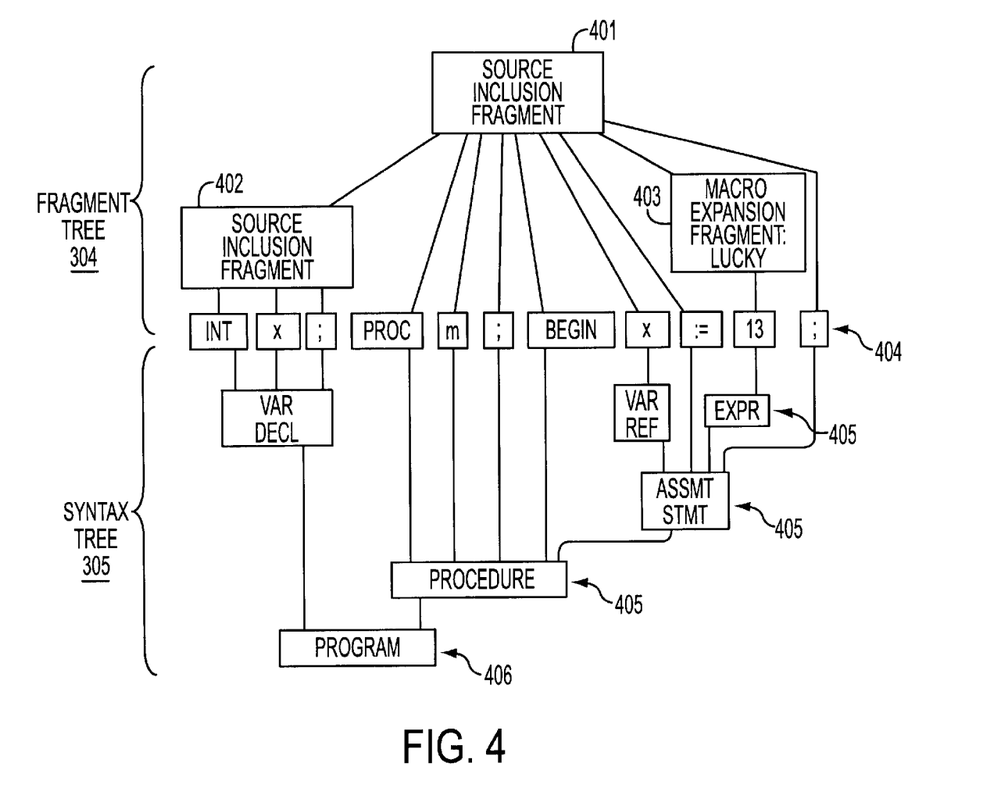
FIG. 4 shows a Syntax Tree and Fragment Tree of the present invention.

The Rosetta Translator (and hence the AITG) is built using standard compiler technology, but with additional steps. For the AITG, the Rosetta Translator has been augmented to use the syntax tree 305 and the fragment tree 304 to create tests using the test generator 308. FIG. 4 is a diagram of a syntax tree and a fragment tree showing both source file inclusions and macro substitution for a sample code as follows:

| Main code file | file incl.h |
|---|---|
| DEFINE lucky =13# | INT x; |
| ?SOURCE incl.h | |
| PROC m; | |
| BEGIN | |
|   x:=lucky; | |
| ... | |

The illustrated fragment tree 304 includes source inclusion fragments 401 and 402 and a macro expansion fragment 403. A fragment tree actually represents every source inclusion, macro expansion and actual macro parameter substitutions employed to create the virtual source. Namely, the fragment tree represents the virtual source production mechanisms that were employed to create the virtual source. Each fragment in the fragment tree 304 contains a stream of tokens 404 that result from invoking a virtual source production mechanism. Some tokens may themselves represent virtual source production mechanisms.

From the fragment tree 304, the parser 303 produces the syntax tree 305 that is a syntactic structure of the virtual source. Explicit tokens 404 appear as the leaves of the otherwise traditional syntax tree. Each of these tokens 404 is also a leaf of the virtual fragment tree 304, indicating which virtual source production mechanism brought it into the virtual source. The syntax tree 305 and the fragment tree 304 are said to be "joined at the tokens" 404. The Rosetta Translator uses the syntax tree 305 and the fragment tree 304 to create tests. The test generator generates the Do and Verify code components, each component being translated by the Rosetta Translator. The details of the Do and Verify code generated for the various interface components are described in the following sections.

Figure 5:
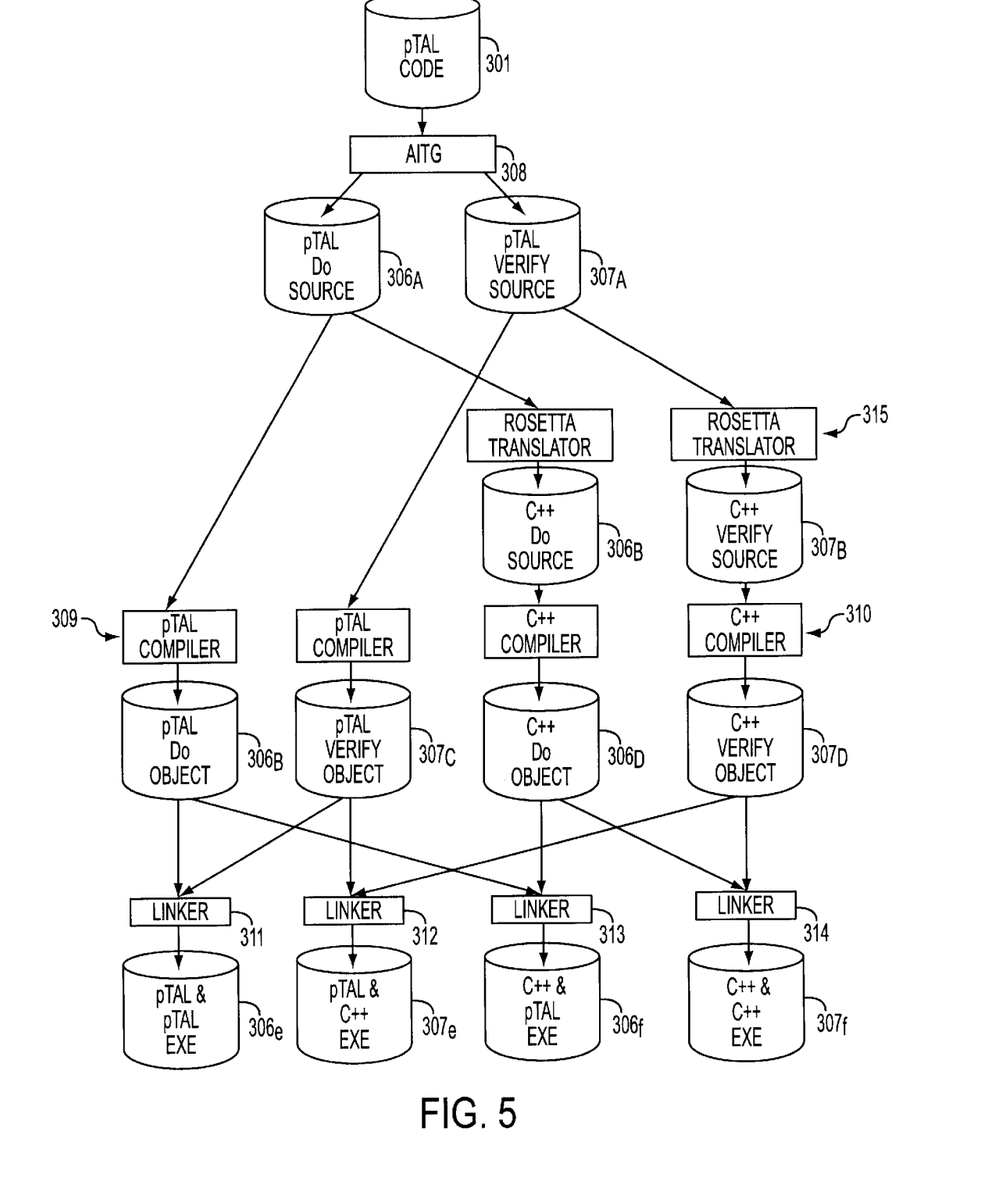
FIG. 5 shows inter-language linking of test components.

The Do component sets data values, and calls routines in the Verify component. The Verify component checks the data values. Each of the values includes data, constant, procedure, and type declarations derived from the input source code. The Do and Verify components are linked together to create an executable test. FIG. 5 illustrates inter-language linking of test components. As shown, the AITG generates Ptal code for both the Do and Verify components (e.g., $306_A$ and $307_A$). Each component is translated by the Rosetta Translator 315, compiled (309, 310) and bound with the opposite untranslated component, via a linker (311–314), to create executable tests (e.g., four executable tests $306_e$, $307_e$, $306_f$, $307_f$) for inter-language compatibility.

One of the four tests is global variables test. A routine in the Do components assigns a value to each global variable and calls a routine in the Verify Component to verify the values. The test checks the lowest possible value for each basic type, the highest possible value for each basic type, a zero value if appropriate, and a randomly selected value between for each basic type. It tests aggregate type variables similarly, assigning values to each component of the variable. For example, suppose the following program were processed by the AITG:

PROC p MAIN;

BEGIN . . .

The AITG would create Do and Verify components that test the global variable glob as follows:

| Do component | Verify component |
|---|---|
| INT(16) glob; | INT(16) glob; |
| PROC DoProc1; | PROC VerifyProc1 (casenum); |
| BEGIN | INT(16) casenum; |
|     glob := –32768; | BEGIN |
|     CALL VerifyProc1(1); | 1 -> IF glob <> –32768 THEN |
|     glob := 0; |     CALL ReportError; |
|     CALL VerifyProc1(2); | 2 -> IF glob <> 0 THEN |
|     glob := 25345; |     CALL ReportError; |
|     CALL VerifyProc1(3); | 3 -> IF glob <> 25345 THEN |
|     glob := 32767; |     CALL ReportError; |
|     CALL VerifyProc1(4); | 4 -> IF glob <> 32767 THEN |
| |     CALL ReprtError; |

A second of the four tests is procedure interfaces test. The AITG tests procedure profiles that it scans from the input program. The Do component performs a series of calls sending a value via each parameter to the Verify component which verifies the expected value for each call. This test checks the lowest value for each basic type, the highest possible value for each basic type, a zero value if appropriate, and a randomly selected value between for each basic type. It tests aggregate-type parameters similarly, assigning values to each component of the aggregate, and verifying it one component at a time. As an example, consider the following program.

PROC Fred (a);

INT(16) a;

EXTERNAL;

PROC q MAIN;

BEGIN

. . .

In processing the above program, the AITG creates Do and Verify components that test the profile of the procedure Fred. Notice that the Verify test component supplies an implementation of the procedure Fred.

| Do component | Verify component |
|---|---|
| PROC DoFred; | INT(16) casenum; |
| BEGIN | |
|     INT(32) param_a; | PROC Fred (a): |
|     param_a := –32768; |     INT(16) a; |
|     casenum := 1; | BEGIN |
|     CALL Fred (param_a); |     CASE (casenum) OF BEGIN |
|     param_a := 0; | 1 -> IF a <> –32768 THEN |
|     casenum := 2; |     CALL ReportError; |
|     CALL Fred (param_a); | 2 -> IF a <> 0 THEN |
|     param_a := 125; |     CALL ReportError; |
|     casenum: = 3; | 3 -> IF a <> 125 THEN |
|     CALL Fred (param_a); |     CALL ReportError; |
|     param_a := 23767 | 4 -> IF a <> 32767 THEN |
|     casenum := 4; |     CALL ReportError; |
|     CALL Fred (param_a) | |

A third of the four tests is named constants test. The AITG tests literal definitions that it scans in the input program. For example:

literal abc=13D;

The AITG creates Do and Verify components that verifies the translation of the literal definitions as follows:

| Do component | Verify component |
|---|---|
| PROC DoProc2; | PROC VerifyProc2 (casenum, val); |
| BEGIN | INT(16) casenum; |
|     CALL VerifyProc2 (1, abc); | INT(16) val; |
| | BEGIN |
| |     CASE (casenum) OF BEGIN |
| | 1-> IF abc <> val THEN |
| |     CALL ReportError; |

The fourth test uses actual interface files in the generated tests to verify interfaces to procedures. The AITG tests procedure's interface by substituting a set of verification actions for the body of the procedure; it supplies a body for external procedures. In order to prove that the generated tests are testing the actual Ptal sources and their translations, it is desirable for the Do and Verify components to include the exact interface files that the AITG's input program includes. If, however, the included files contain code bodies, the bodies must be excluded so as not to conflict with those supplied in the Verify component.

The AITG adopted a compromise, which is to generate a file called the "almost root source." The almost root source is the actual root source for a Ptal compilation unit, with any procedure bodies cut out. Since this root source ultimately includes, directly or indirectly, all other sources used in the compilation unit, the AITG must exclude procedure bodies found also in included files. Each of the Do and Verify component includes this almost root source file, so both components use exactly the same interface definitions. For example, suppose the file 'fred' includes two files, 'joe' and 'ralph' as follows:

| fred | joe | ralph |
|---|---|---|
| ?SOURCE joe | STRUCT s(*); | STRUCT t(*); |
| ?SOURCE ralph | BEGIN | BEGIN |
| | INT x; | STRING a; |
| | END; | END; |
| INT PROC p MAIN; | | |
| BEGIN | | |
| INT result; | INT glob; | PROC ralph_p (a); |
| STRUCT sam(s); | | INT a; |
| | PROC joe_p (SSS); | BEGIN |
| CALL joe_p; | INT.. EXT sss(s); | RETURN a+13; |
| Result := ralph_p; | EXTERNAL; | END; |

Each of the Do and Verify components that the AITG generates in response to this input code includes a file of interface information: "the almost root source". Because the file joe contains no procedure bodies, the almost root source can simply include the file. Because the file ralph does contain a procedure body, the AITG copies the interface information excluding the procedure body into the almost root source. In the following example, the include file fred_verexts contains the externals of the generated Verify component.

| fred_do | fred_verify | fred_ars |
|---|---|---|
| ?SOURCE fred_ars | ?SOURCE fred_ars | ?SOURCE joe |
| ?SOURCE fred_verexts | | |
| | PROC VerifyProc1 (c); | STRUCT t(*); |
| PROC DoProc1; | INT(16) c; | BEGIN |
| BEGIN | BEGIN | STRING a; |
| ... | CASE (c) OF BEGIN | END; |
| | ... | |
| | | PROC ralph_p (a); |
| | PROC ralph_p (a); | INT a; |
| | INT a; | EXTERNAL; |
| | BEGIN | |
| | CASE (casenum) OF | INT casenum; |
| | ... | |

An include file that contains a procedure body is considered tainted. An include file that includes a tainted file is in turn tainted. The following algorithm creates the almost root source file by identifying tainted files and replacing the source inclusion of a tainted file with the text comprising the interface information only. The first routine, MarkTainted, traverses each token in the virtual source by performing an in order traversal of the syntax tree. It is noted that this algorithm can be optimized to copy text directly from a file rather than writing each token to an output file.

The operations can be described as follows:
IsSourceInclusionFragment (f); TRUE if the fragment f is a source inclusion fragment, as opposed to a macro expansion fragment or a macro actual parameter expansion.
IsRootFragment (f): TRUE if the fragment f is the root of the fragment tree.
RootFragment: returns the source inclusion fragment that is the root of the fragment tree.
Parent (f): returns the fragment containing the invocation syntax tokens of fragment f.
InvocationSyntax (f): returns the invocation syntax token (s) that expand to the fragment f.
MarkTainted (t): marks the source inclusion fragment as containing tainted tokens, which are to be excluded from the almost root source, or as containing an invocation of a tainted fragment (including a tainted source file).
IsTainted (t): TRUE if the fragment f is tainted.
BeginsProcBody (t): TRUE if the token t begins a procedure body.
EndsProcBody (t): TRUE if the token t ends a procedure body.
MarkTainted (t): marks the token t as tainted, to be excluded from the almost root source.
IsTainted (t): TRUE if the token t is tainted.
ContainingFragment (t): returns the fragment containing the token t.
IsInvocationSyntax (t): TRUE if the token t is invocation syntax for a fragment (e.g., a source inclusion, the name of a macro, or the name of a macro actual parameter).
WriteToARS (t): Writes the token t to the almost root source file.

Routine MarkTainted

```
/* identify tainted tokens and files */
FOR (token = each token in the virtual source) BEGIN
    If(BeginsProcBody (token)) THEN BEGIN
        DO BEGIN
        MarkTainted (token)
        ContainingFragment = ContainingFragment (token)
        WHILE (NOT IsRootFragment (containingFragment)) DO BEGIN
            IF (IsSourceInclusionFragment (containingFragment)) THEN
                MarkTainted (containingFragment)
            ContainingFragment = Parent (containingFragment)
        END UNTIL (EndsProcBody (token))
    END
END
EmitText (RootFragment())
Routine EmitText (currentFragment)

/* generate the almost root source */
IF (IsSourceInclusionFragment (currentFragment)) THEN BEGIN
    IF (IsTainted (currentFragment)) THEN BEGIN
        FOR (token = each token in currentFragment) BEGIN
            IF (IsInvocationSyntax (token)) THEN BEGIN
                EmitText (InvokedFragment (token))
                IF (NOT IsTainted (token)) THEN
                    WriteToARS (token)
            END
        END ELSE BEGIN
            /* write the ?SOURCE directive that includes this file */
            WriteToARS (InvocationSyntax (currentFragment))
        END
    END ELSE BEGIN
        WriteToARS (InvocationSyntax (currentFragment))
    END
```

Generating the Do and Verify Components

The AITG generates the Do and Verify test components on a simple in-order traversal of the syntax tree. The operations can be described are as follows:
WriteToDo (text): write the text to the generated Do test component file.
WriteToVerify (text): write the text to the generated Verify test component file.
IsProc (c): TRUE if the syntactic construct c is a parameterized procedure.

IsGlobalVar (c): TRUE if the syntactic construct c is a global variable.

IsLiteral (c): TRUE if the syntactic construct c is a literal.

---

Routine GenerateDoAndVer

WriteToVerify (<source inclusion directive for almost root source>)
WriteToDo (<source inclusion directive for almost root source>)
FOR (currentConstruct = each construct in the syntax tree) BEGIN
   IF (IsProc(currentConstruct)) THEN BEGIN
      WriteToVerify (<proc header tokens from currentConstruct>)
      WriteToVerify (*BEGIN*)
      WriteToVerify (<verification code for low value for each
          component of each parameter>)
      WriteToVerify (<verification code for medium value for each
          component of each parameter>)
      WriteToVerify (<verification code for high value for each
          component of each parameter>)
      WriteToVerify ("END")
      WriteToDo (<beginning of a test procedure>)
      WriteToDo (<variable declarations that match parameters of
          procedure currentComponent>)
      WriteToDo (<assign low value to each component of variables
          to send as parameters to verify routine>)
      WriteToDo (<verification call for low value for each
          component of each parameter>)
      WriteToDo (<assign medium value to each component of
          variables to send as parameters to verify
          routine>)
      WriteToDo (<verification call for medium value for each
          component of each parameter>)
      WriteToDo (<assign high value to each component of
          variables to send as parameters to verify
          routine>)
      WriteToDo (<verification call for high value for each
          component of each parameter>)
      WriteToDo (<end of a test procedure>)
   END
   IF (IdGlobalVar (currentConstruct)) THEN BEGIN
      WriteToVerify (<beginning of a test procedure>)
      WriteToVerify (<verification code for low value for each
          component of the global variable>)
      WriteToVerify (<verification code for medium value for each
          component of the global variable>)
      WriteToVerify (<verification code for high value for each
          component of the global variable>)
      WriteToVerify (<end of test procedure>)
      WriteToDo (<beginning of a test procedure>)
      WriteToDo (<assign low value to each component of the
          global variable>)
      WriteToDo (<verification call for low values>)
      WriteToDo (<assign medium value to each component of
          global variable>)
      WriteToDo (<verification call for medium values>)
      WriteToDo (<assign high value to each component of
          global variable>)
      WriteToDo (<verification call for high values>)
      WriteToDo (<end of a test procedure>)
   END
   IF (IsLiteral (currentConstruct)) THEN BEGIN
      WriteToVerify (<beginning of a test procedure>)
      WriteToVerify (<verification code for literal>)
      WriteToVerify (<end of a test procedure>)
      WriteToDo (<beginning of a test procedure>)
      WriteToDo (<verification code for literal>)
      WriteToDo (<end of a test procedure>)
   END
END

---

The code generated in the Do and Verify test components can be quite large. This is especially true considering the replication of testing that takes place when a single interface is included in several compilation units, each of which might be tested using AITG. A practical implementation contains support for coping with compiler limits and for optional limits on the scope of testing. It might also use a simple external database of tested components to reduce redundant testing.

During evaluation, the AITG has generated millions of lines of test code. These tests have discovered problems in every step of the compilation pipeline: the source language compiler, the target language compiler, the linker, the debugger, and the Rosetta Translator itself. This technique has proven to be extremely valuable for assuring the accuracy of interfaces produced by a source-to-source translator and for assuring the compatibility of structure layout in different compilers. It has saved countless hours of work in detecting problems in these areas, some of which might have gone undetected until surfacing as a crisis in the execution of production software. It has thus contributed substantially to the success of the source-to-source translation effort.

Although the present invention has been discussed with respect to particular embodiments thereof, it should be understood that the embodiments are but illustrative of specific ways to practice the present invention, the scope of which is determined solely by the appended claims.

What is claimed:

1. A method for assuring the valid operations of a translator that translates an original computer program into a target computer program in a target language, wherein the target language is different from the language of the original computer program, wherein the original computer program includes procedures that have interface specifications, the method executed by a processor coupled to a storage device, the method comprising the steps of:

obtaining the interface specifications from one or more procedure calls in the original computer program;

deriving and storing test procedures that use the obtained interface specifications to determine whether a variable value passed to the test procedures during execution of the test procedures is valid;

using the translator to translate the test procedures into the target language;

linking the translated test procedures to one or more portions of the original computer program to produce a test module;

executing the test module to execute the test procedures and determine whether passed variable values are valid and;

indicating an error condition if a passed variable value it invalid.

2. A method for verifying the operation of a source-to-source translator for translating computer programs from a first language into a second language, the method comprising the steps of:

deriving test procedures having procedure interfaces analogous to the procedure interfaces in the first language; and     analyzing procedure interfaces in both the first and second languages by linking the test procedures to portions of the computer programs.

3. A method for generating self-checking tests of a source-to-source translation, comprising:

generating test components from a source program code, the test components being in an original language;

performing a source-to-source translation of the test components to produce target test components in a target language different from the original language;

compiling the test components and target test components, the compilation producing test objects and target test objects, respectively; and     linking, respectively, the test objects with the target test objects, the linked test and target test objects being executable tests of the source-to-source translation.

4. The method of claim 3, wherein generating test components further includes scanning the source program code, the scanning producing a virtual source that represents the source program code; and parsing the virtual source, the parsing produces the representation in the form of a syntax tree of the virtual source.

5. The method of claim 3, wherein the source program code is in Ptal language.

6. The method of claim 3 wherein, when the original language is Ptal, the source-to-source translation produces the target test components in C++.

7. The method of claim 3, wherein the test components are Verify and Do.

8. The method of claim 3, wherein the source-to-source translation is performed by a Rosetta Translator.

9. The method of claim 3, wherein the virtual source is in the form of a fragment tree.

10. The method of claim 3, wherein the target test components produced by the source-to-source translation continue to be binary-compatible with all other software components with which they previously interacted correctly, including the test components in the original language.

11. A system for testing source-to-source translation in which an original computer program in an original language is translated into a target computer program in a target language that is different from the original language, wherein the original computer program includes procedures that have interface specifications, comprising:

means for obtaining the interface specifications from one or more procedure calls in the original computer program;

means for deriving and storing test procedures that use the obtained interface specifications to determine whether a variable value passed to the test procedures during execution of the test procedures is valid;

means for translating the test procedures into the target language;

means for linking the translated test procedures to one or more portions of the original computer program to produce a test module;

means for executing the test module to execute the test procedures and determine whether passed variable values are valid and;

means for indicating an error condition if a passed variable value it invalid.

12. A system for verifying the operation of a source-to-source translator for translating computer programs from a first language into a second language, the method comprising the steps of means for deriving test procedures having procedure interfaces analogous to the procedure interfaces in the first language; and means for analyzing procedure interfaces in both the first and second languages by linking the test procedures to portions of the computer programs.

13. A system for generating self-checking tests of a source-to source translation, comprising:

a scanner receiving a source program code and producing therefrom a virtual source representing the source program code;

a parser producing a syntax tree representation of the virtual source;

a test generator producing test components, the test components being in an original language;

a translator performing a source-to-source translation of the test components to produce target test components in a target language different from the original language;

a compiler producing test objects and target test objects, respectively, from the test components and target test components; and a linker producing executable tests by linking, respectively, the test objects with the target test objects.

14. The system of claim 13, wherein the source program code is in Ptal language.

15. The system of claim 13 wherein, when the original language is Ptal, the source-to-source translation produces the target test components in C++.

16. The system of claim 13, wherein the test components are Verify and Do.

17. The system of claim 13, wherein the translator is a Rosetta Translator.

18. The system of claim 13, wherein the scanner is configured to derive interface elements of the source program code including data declarations and procedure profiles, and wherein the system is configured to test only interface elements that it scans from the source program code rather than use any external data dictionary or repository.

19. The system of claim 13, wherein the virtual source is in the form of a fragment tree.

20. The system of claim 13, wherein the target test components produced by the source-to-source translation continue to be binary-compatible with all other software components with which they previously interacted correctly, including the test components in the original language.

* * * * *